US012244085B2

(12) United States Patent
Meng et al.

(10) Patent No.: US 12,244,085 B2
(45) Date of Patent: Mar. 4, 2025

(54) BOARD-TO-BOARD CONNECTOR ASSEMBLY

(71) Applicant: Advanced Connectek Inc., New Taipei (TW)

(72) Inventors: Ta-Teh Meng, New Taipei (TW); Mei Shi, New Taipei (TW); Ya-Ping Liang, New Taipei (TW); Ping Shi, New Taipei (TW); Meng Liu, New Taipei (TW); Jing Zhe Wang, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 449 days.

(21) Appl. No.: 17/892,128

(22) Filed: Aug. 22, 2022

(65) Prior Publication Data

US 2023/0065545 A1 Mar. 2, 2023

(30) Foreign Application Priority Data

Aug. 31, 2021 (CN) ........................ 202111009981.2

(51) Int. Cl.
*H01R 12/72* (2011.01)

(52) U.S. Cl.
CPC .................................. *H01R 12/727* (2013.01)

(58) Field of Classification Search
CPC ...... H01R 12/71; H01R 12/712; H01R 12/72; H01R 12/722; H01R 12/727
USPC ........................................................... 439/79
See application file for complete search history.

(56) References Cited

U.S. PATENT DOCUMENTS 5,895,278 A * 4/1999 Humphrey ......... H01R 13/6471 439/67
5,895,284 A * 4/1999 Kocher .............. H01R 13/6273 439/357
6,074,230 A * 6/2000 Comerci ................ H01R 24/84 439/862

* cited by examiner

*Primary Examiner* — Khiem M Nguyen
(74) *Attorney, Agent, or Firm* — JCIPRNET

(57) ABSTRACT

A board-to-board connector assembly includes: a plug connector having: a second body having a second slot and a second sidewall; and third metal members; and a socket connector having: a first body having an island, a first slot, and a first sidewall; and first and second metal members. The first metal members are disposed in the first body and extend from a bottom of the first sidewall to the island through the first slot. The second metal members are disposed in the first body, and straddles and covers a portion of the first sidewall. The third metal members are disposed in the second body, and straddle and cover a portion of the second sidewall. When the connectors are mated, the second sidewall is inserted into the first slot, the island is inserted into the second slot, and the third metal members are pressed against the first and second metal members.

20 Claims, 6 Drawing Sheets

BOARD-TO-BOARD CONNECTOR ASSEMBLY

CROSS-REFERENCE TO RELATED APPLICATION

This application claims the priority benefit of China application serial no. 202111009981.2, filed on Aug. 31, 2021. The entirety of the above-mentioned patent application is hereby incorporated by reference herein and made a part of this specification.

BACKGROUND

Technical Field

The invention relates to a connector assembly.

Description of Related Art

A board-to-board connector is configured to connect different circuit boards and is provided with a socket connector and a plug connector to be respectively installed to different circuit boards and connect the circuit boards with each other. In a mobile device such as a smart phone, the size of such board-to-board connector is quite small. As a result, the structural strength and the service time of each connector are reduced.

Moreover, the reduced structural strength is also evident in a plugging/unplugging operation between a male end (plug) and a female end (socket). That is, in a part of the structure, the strength or terminal elasticity is reduced, which leads to damages resulting from structural interference during a process of unplugging the male end and the female end from each other. Besides, in some usage environments, there is a demand of transmitting a higher current in an electronic module inside a device for the convenience of charging or information transmission. In such scenario, the demands on the manufacturing specification of a board-to-board connector also increase.

Thus, how to facilitate the structural strength of a board-to-board connector while meeting relevant specifications for high current transmission has become an issue to work on.

SUMMARY

An aspect of the invention provides a board-to-board connector, in which functions as required are separately assigned to different metal members, thereby exhibiting favorable structural strength when connectors are mated as well as efficient electrical conduction and thus providing reliable connectors.

A board-to-board connector according to an aspect of the invention includes a plug connector and a socket connector mated with each other. The socket connector includes a first body, a pair of first metal members, and a pair of second metal members. The first body has a middle island, a first accommodating slot surrounding the middle island, and a first sidewall surrounding the first accommodating slot. The first metal members are respectively provided on opposite ends of the first body. Each of the first metal members extends from a bottom of the first sidewall to the middle island by passing through the first accommodating slot. The second metal members are respectively provided on opposite ends of the first body. Each of the second metal members straddles and covers a portion of the first sidewall. The plug connector includes a second body and a pair of third metal members. The second body has a second accommodating slot and a second sidewall surrounding the second accommodating slot. The third metal members are respectively provided on opposite ends of the second body. Each of the third metal members straddles and covers a portion of the second sidewall. When the plug connector is mated with the socket connector, the second sidewall is inserted into the first accommodating slot, the middle island is inserted into the second accommodating slot, and the third metal members are pressed against the first metal members and the second metal members.

Based on the above, the socket connector of the board-to-board connector assembly is provided with the pair of first metal members and the pair of second metal members provided in the first body to separately provide the functions of the socket connector in the first metal members and the second metal members. The first metal member extends from the bottom of the first sidewall to the middle island by passing through the first accommodating slot, and the second metal member straddles the first sidewall. Therefore, when the connectors are mated, the first metal member and the second metal member are respectively pressed against the third metal member of the plug connector. As a consequence, the force taken by these metal members can be effectively spread when the connectors are mated.

In other words, compared with the conventional connectors in which the metal members are mated in a one-to-one relationship (i.e., one for each of the plug connector and the socket connector), the first metal member and the second metal member are adopted in the embodiments of the invention to share the force taken when the connectors are mated/released (or plugged/unplugged), making the structural strength between the metal members and the bodies sufficient for the plugging/unplugging process and avoiding damages during such process.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
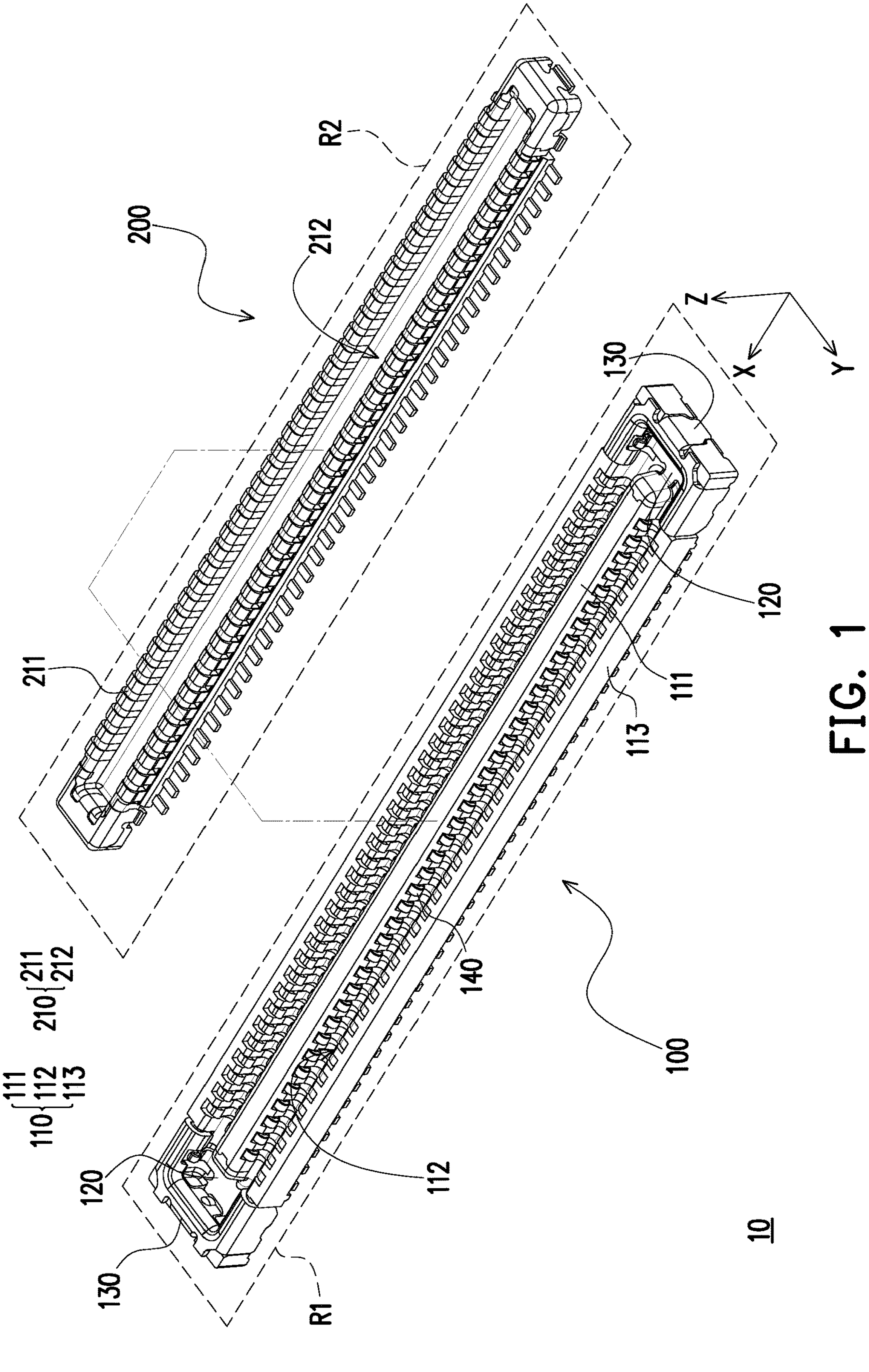
FIG. 1 is a schematic view illustrating assembling of a board-to-board connector according to an embodiment of the invention.

FIG. 1 is a schematic view illustrating assembling of a board-to-board connector according to an embodiment of the invention. Referring to FIG. 1, in the embodiment, a board-to-board connector assembly 10 includes a socket connector 100 and a plug connector 200 mated with each other. In FIG. 1, the socket connector 100 is provided on a circuit board R1, the plug connector 200 is provided on a circuit board R2. Therefore, by mating the socket connector 100 and the plug connector 200 with each other, the circuit boards R1 and R2 are electrically conductive to each other.

Figure 2:
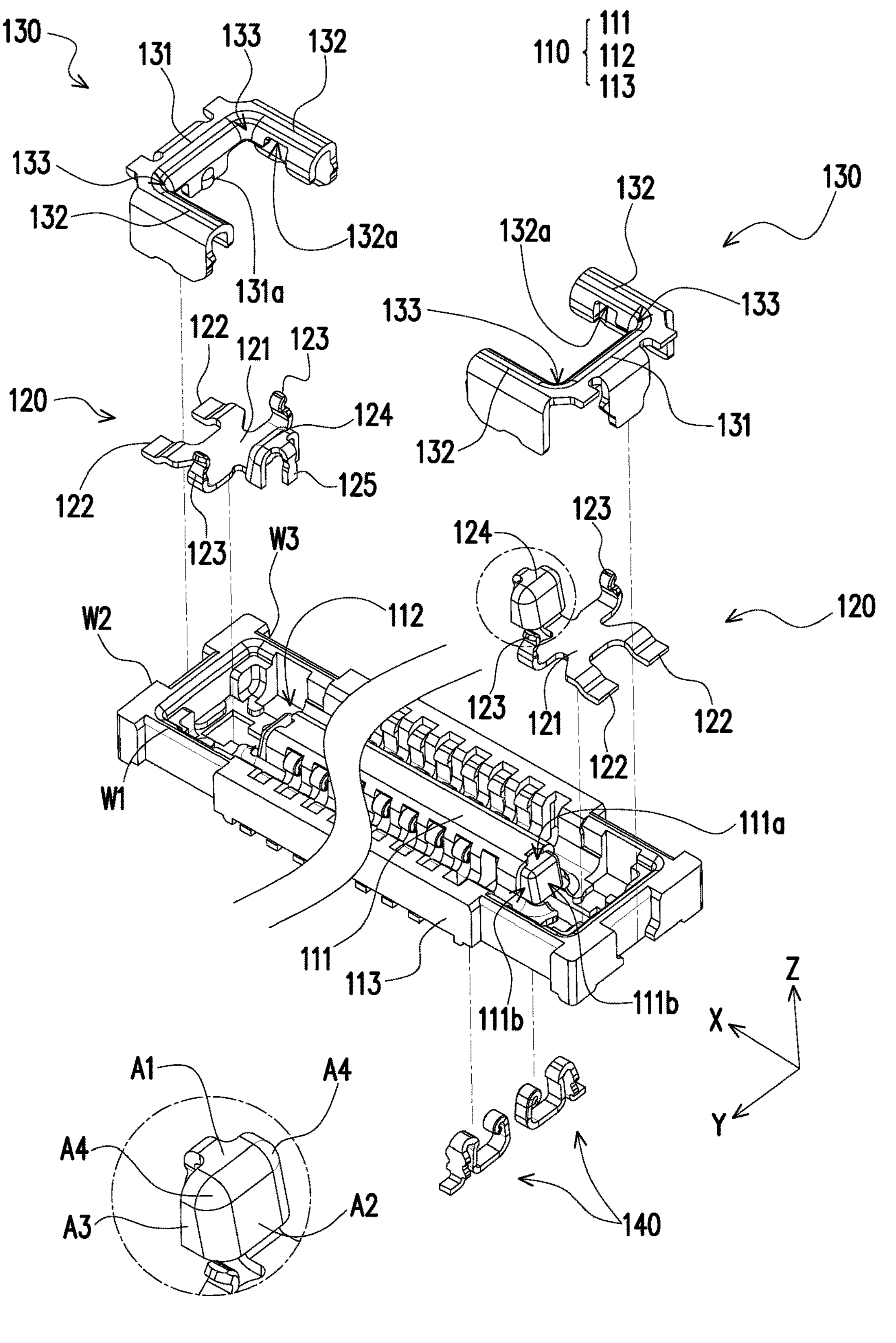
FIG. 2 is an exploded view illustrating a socket connector of FIG. 1.

FIG. 2 is an exploded view illustrating a socket connector of FIG. 1. Here, a Cartesian coordinate system is provided for the ease of describing components. Also, in the embodiment, the Cartesian system is set by using the socket connector 100 as reference. In other words, for the ease of identification, FIG. 1 illustrates a state in which the accommodating slots of both the socket connector 100 and the plug connector 200 face upward, and when the plug connector 200 is mated with the socket connector 100, the plug connector 200 shown in FIG. 1 is rotated 180 degrees and then mated with the socket connector 100.

Referring to FIGS. 1 and 2, in the embodiment, the socket connector 100 includes a first body 110, a pair of first metal members 120 and a pair of second metal members 130. The first body 110 is insulating and includes a middle island 111, a first accommodating slot 112 surrounding the middle island 111, and a first sidewall 113 surrounding the first accommodating slot 112. The first metal members 110 are respectively provided at opposite ends of the first body 110 along X-axis, and each of the first metal members 110 extends along X-axis from the bottom of the first sidewall 113 to the middle island 111 by passing through the first accommodating slot 112. The second metal members 130 are respectively provided at opposite ends of the first body 110 along X-axis, and each of the second metal members 130 straddles and covers a portion of the first sidewall 113. Moreover, the socket connector 110 includes multiple first terminals 140 provided in the first body 110 and extending along Y-axis from the first sidewall 113 to the middle island 111 by passing through the first accommodating slot 112.

Figure 3:
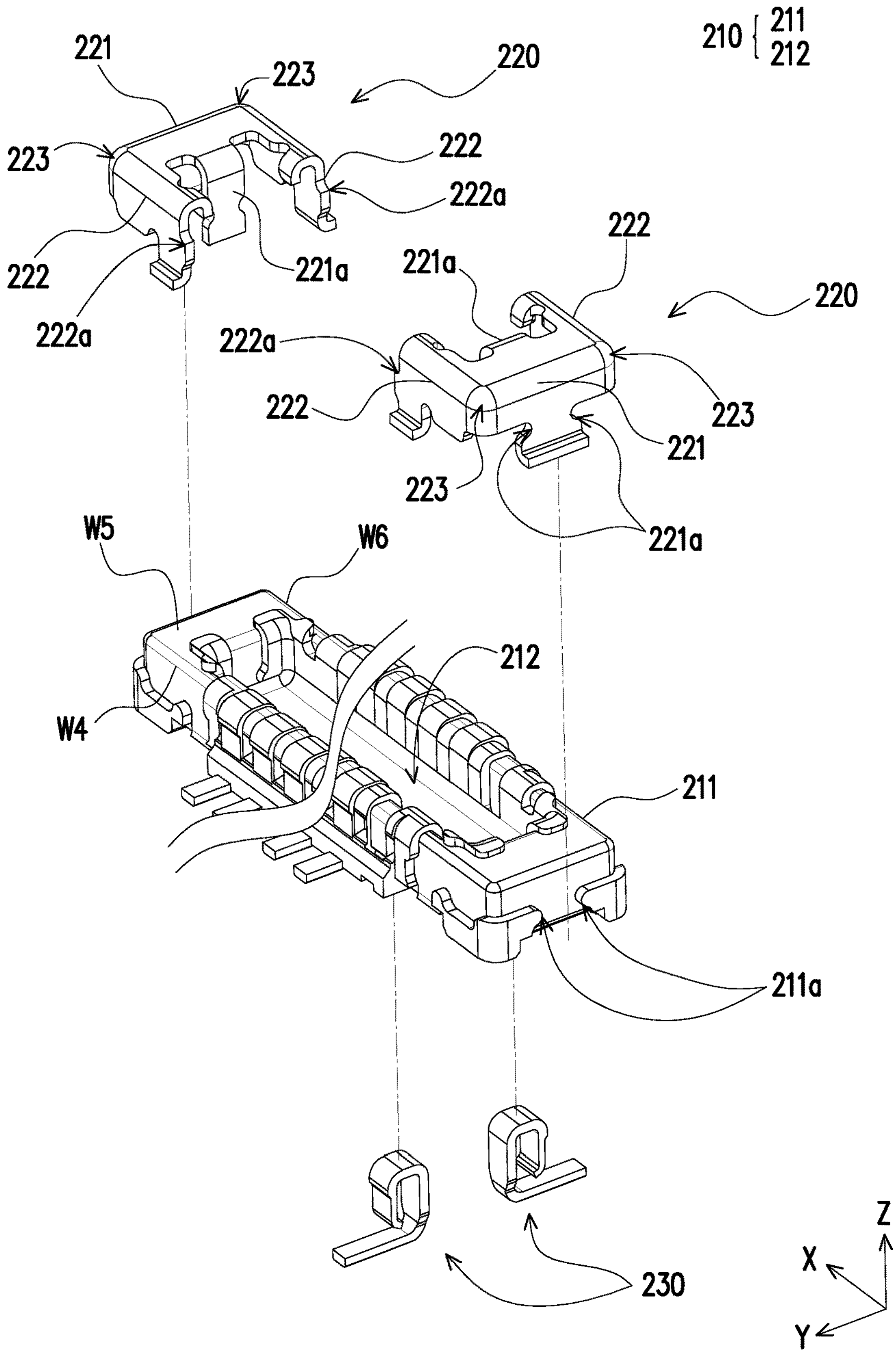
FIG. 3 is an exploded view illustrating a plug connector of FIG. 1.

FIG. 3 is an exploded view illustrating a plug connector of FIG. 1. Referring to FIGS. 1 and 3 together, the plug connector 200 of the embodiment includes a second body 210, a pair of third metal members 200, and multiple second terminals 230. The second body 210 is insulating and includes a second accommodating slot 212 and a second sidewall 211 surrounding the second accommodating slot 212. The third metal members 220 are respectively provided at opposite ends of the second body 210 along X-axis, and each of the third metal members 220 straddles and covers a portion of the second sidewall 211.

Referring to FIG. 2 again, in the embodiment, the first metal member 120 substantially has a human-shaped profile, and includes a body plate 121 located at the bottom of the first accommodating slot 112, two feet 122 extending from the body plate 121 to the bottom part of the first sidewall 113, a pair of elastic bodies 123 respectively extending from opposite parts of the body plate 121 toward the top of the first sidewall 113 and bent, and a head part 124 extending from the body plate 121 and covering a portion of the middle island 111. The head part 124 and the feet 122 are located on opposite sides of the body plate 121 on X-axis. Here, the first metal member 120 is integrated with the first body 110 by, for example, performing an insert molding process, and the head part 124 covers at least one outer wall surface of the middle island 111. More specifically, as shown in FIG. 2, the head part 124 of the first metal member 120 of the embodiment covers an outer wall surface 111*b* of the middle island 111 and a top part 111*a* of the middle island 111. In addition, the head part 124 also has a bent part 125 extending from the top part 111*a* of the middle island 111 and embedded in the middle island 111, thereby reinforcing the integration strength between the first metal member 120 and the first body 110.

It is noted that the first metal member 120 of the embodiment is formed by performing a drawing process on a metal plate. Therefore, the head part 124 includes at least three sub-portions and one drawn sub-portion. As shown in the partially enlarged view at the lower left of FIG. 2, the head part 124 may be further distinguished into sub-portions A1 and A2, a pair of sub-portions A3 (only one of which is shown in FIG. 2), and a pair of drawn sub-portions A4. The sub-portion A1 covers the top part 111*a* of the middle island 111, the sub-portion A2 and the pair of sub-portions A3 respectively cover three wall surfaces 111*b* of the middle island 111, and the drawn sub-portions A4 are respectively adjoined between the sub-portion A1 and the sub-portions A3. With the drawn sub-portions A4 formed by the drawing process, the first metal member 120 of the embodiment has an increased coverage area with respect to the first body 110, thereby facilitating the protection to the first body 110.

Similarly, the second metal member 130 of the embodiment is also formed by performing a drawing process and includes three first cover parts 131 and 132, i.e., the first cover part 131 located in the middle and two first cover parts 132 located on opposite sides. That is, the first cover parts 132 extend from opposite sides of the first cover part 131. The second metal member 130 subjected to a drawing process is further formed with a first drawn part 133. Here, the first cover parts 131 and 132 are respectively in an (asymmetric) inverted U shape to straddle three adjacent first wall bodies W1, W2, and W3 of the first sidewall 113, and each first drawn part 133 is adjoined, at an inner bent part, between two adjacent first cover parts 131 and 132. Accordingly, the second metal member 130 also has an increased coverage area with respect to the first body 110, thereby facilitating the protection to the first body 110.

Referring to FIG. 3, the third metal member 220 includes three second cover parts 221 and 222, and a pair of the second cover parts 222 extend from opposite sides of the second cover part 221. Two second drawn parts 223 are also formed by performing a drawing process. The second cover parts 221 and 222 each have an (asymmetric) inverted U-shaped profile and straddle adjacent three second wall bodies W4, W5, and W6 of the second sidewall 211. Each second drawn part 223 is adjoined, at an outer bent part, between two adjacent second cover parts 221 and 222. Similarly, with the drawing process, the third metal member 220 also has an increased coverage area with the second body 210. Moreover, with the second cover part 221 located in the middle, the third metal member 220 is further provided with recesses 221*a* configured to be correspondingly integrated with protrusions 221*a* of the second body 210. In addition, the second cover parts 222 located on opposite sides are respectively provided with reversed hooks 222*a*, so as to be hooked to the second body 210 during insert molding. The recessed/protrusion structures or reversed hooks mentioned above are generally capable of facilitating the integration strength among the components.

Figure 4:
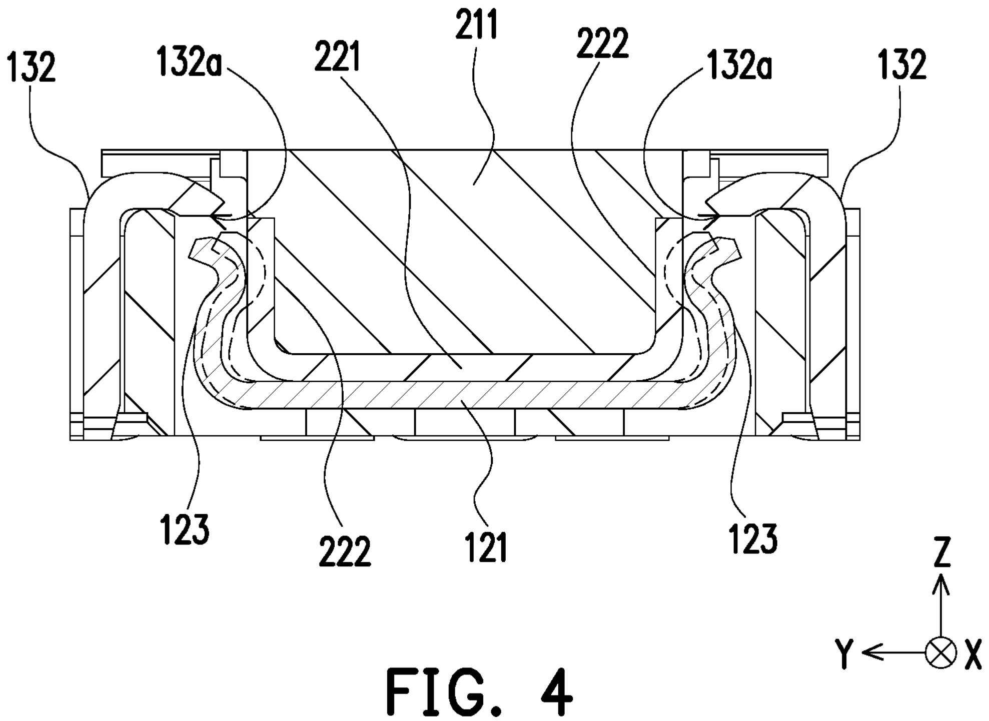
FIGS. 4 to 6 are cross-sectional views taken at different parts of the connector assembly.
Figure 5:
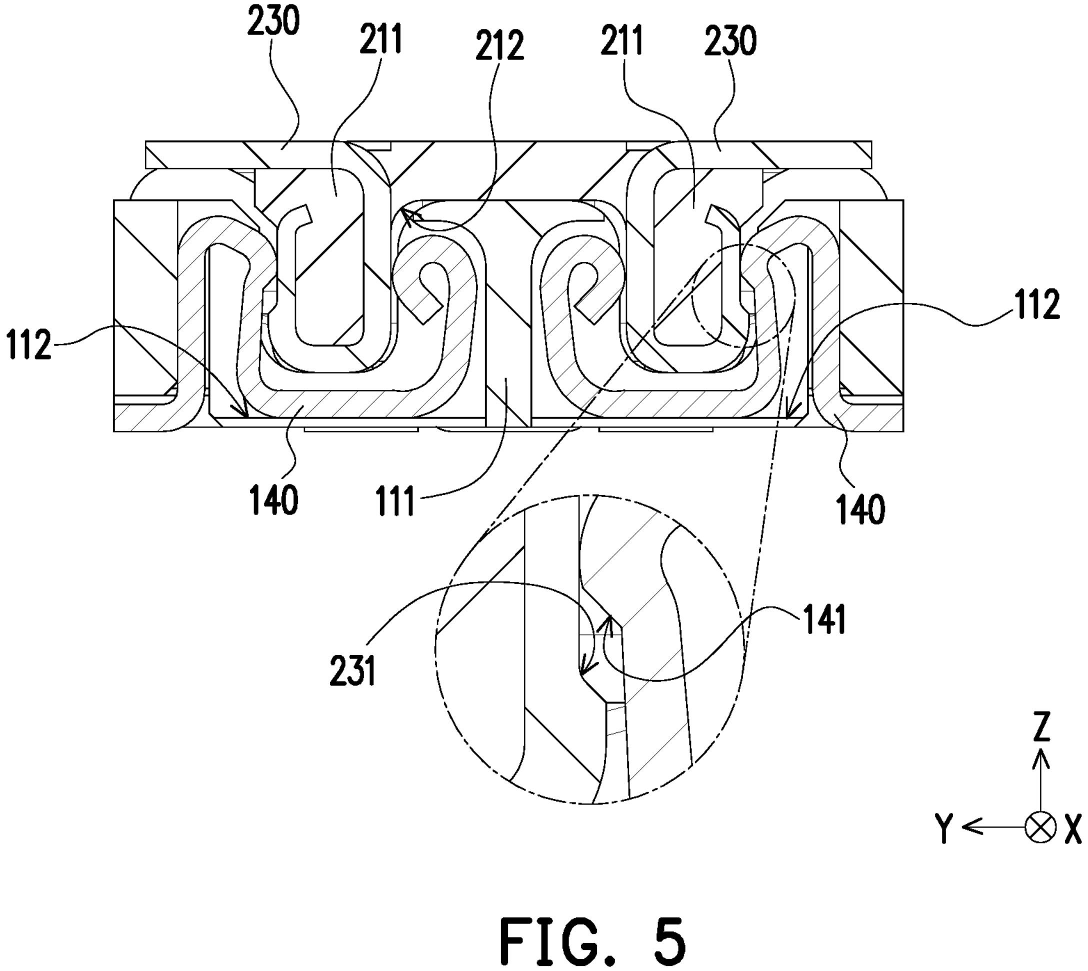
Figure 6:
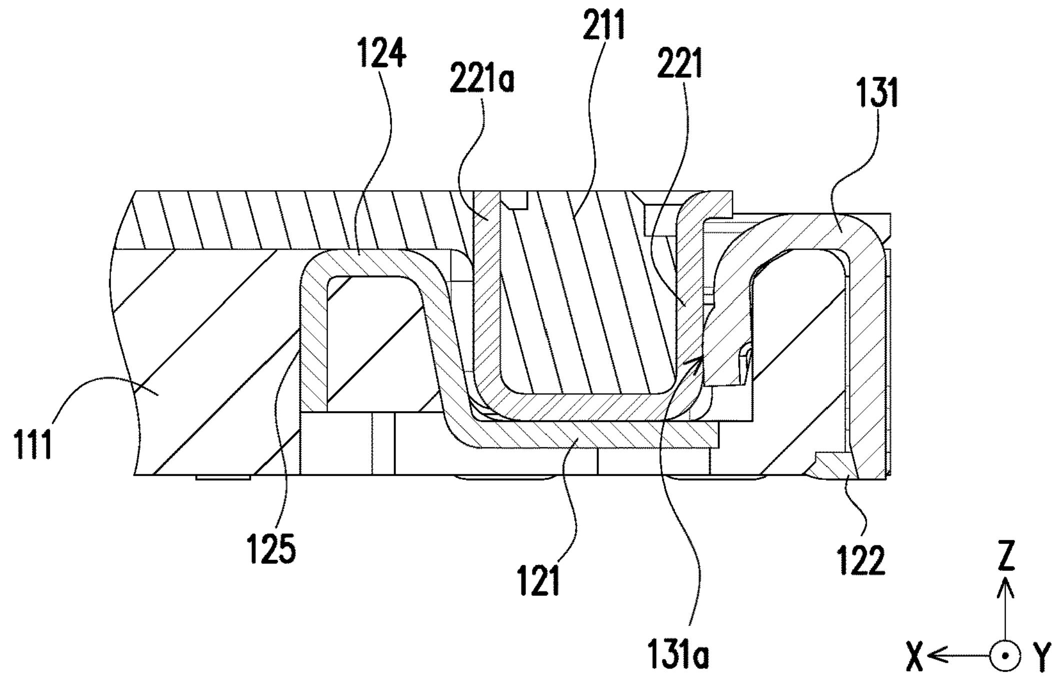

FIGS. 4 to 6 are cross-sectional views taken at different parts of the connector assembly. Referring to FIGS. 1, 2, and 4, in the socket connector 100, the first cover parts 132 located on the opposite sides of the second metal member 130 respectively have notches 132*a* in correspondence with the two elastic bodies 123 of the first metal member 120. More specifically, when the plug connector 200 is mated with the socket connector 100, the second sidewall 211 is inserted into the first accommodating slot 112, the middle island 111 is inserted into the second accommodating slot 212, and the third metal member 220 is pressed against the first metal member 120 and the second metal member 130. As shown in FIG. 4, the elastic body 123 is pressed against and electrically conductive to the second cover part 222 of the third metal part 220. In addition, the elastic body 123 is pressed by the second cover part 221 and expanded, as shown in the profile of the elastic body 123 in broken and solid lines.

Accordingly, the expanded elastic body 123 corresponds to a local structure of the first cover part 132 at the notch 132*a*. Accordingly, in a removing direction of the plug connector 200 and the socket connector 100 (assuming that the socket connector 100 serves as the basis and remains fixed, the plug connector 200 is removed from the socket connector 100 in a direction equivalent to the positive Z-axis direction), the local structure of the first cover part 132 located at the notch 132*a* is located on a movement path of the elastic body 123.

Meanwhile, referring to FIGS. 2, 3, and 6 together, the first cover part 131 located in the middle of the second metal member 132 is further provided with a bump 131*a* facing toward the middle island 111 of the first body 110. When the socket connector 200 is mated with the plug connector 100, the second metal member 130 is pressed against and electrically conductive to the third metal member 220 through the bump 131*a*. In this way, in addition to serving for electrical conduction to the third metal member 220, the second metal member 130 also serves as a stopper of the first metal member 120. That is, when the plug connector 200 is to be removed, the local structure of the second metal member 130 at the notch 132*a* is able to interfere with the elastic body 123, thereby preventing the first metal member 120 from being driven by the plug connector 200 to be detached from the first body 110 during the removal process.

Referring to FIGS. 2, 3, and 5, in the board-to-board connector assembly 10 after mating, the first terminals 140 and the second terminals 230 are correspondingly pressed against each other, each of the first terminals 140 extends from the first sidewall 113 to the middle island 111 by passing through the first accommodating slot 112, and each of the first terminals 140 has a necking structure 141 at the first sidewall 113. Each of the second terminals 230 surrounds a local surface of the second body 210, and is provided with a step difference 231 at the second sidewall 211 facing away from the second accommodating slot 212. The first terminal 140 and the second terminal 230 corresponding to each other are locked to each other through the necking structure 141 and the step difference 231. In this way, a locking relationship is built by using the necking structure 141 and the step difference 231 in the removing direction of the plug connector 200 with respect to the socket connector 100, so as to facilitate the mating strength between the plug connector 200 and the socket connector 100.

Figure 7:
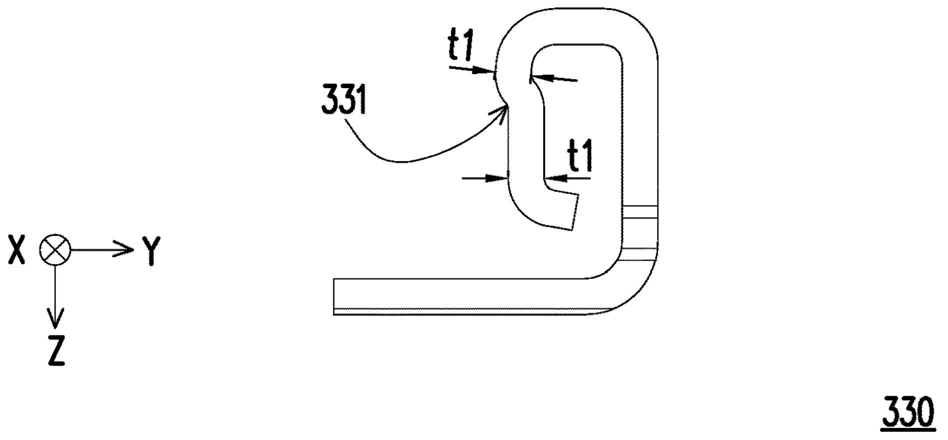
FIG. 7 is a schematic view illustrating a second terminal according to another embodiment of the invention.

FIG. 7 is a schematic view illustrating a second terminal according to another embodiment of the invention. Referring to FIG. 7, what mainly differs from the above embodiment is that, in the above embodiment, the second terminal 230 is provided with the step difference 231 formed by a (thickness) thinning process, whereas a second terminal 330 of the embodiment is formed with a bent structure 331 while keeping a constant thickness (thickness t1). In this way, the bent structure 331 can also be locked with the necking structure 141 of the first terminal.

Figure 8:
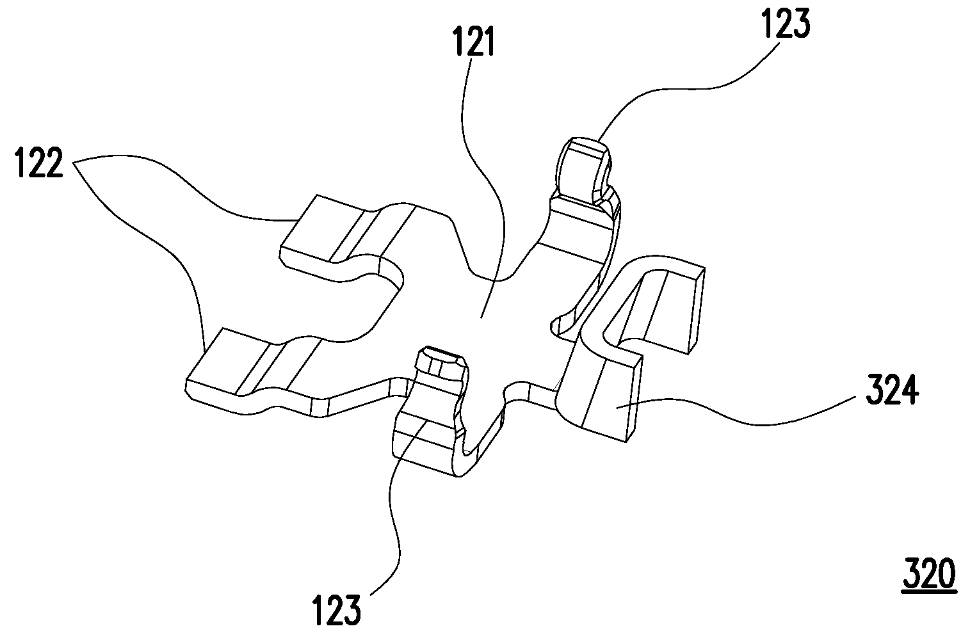
FIGS. 8 and 9 are schematic views of a first metal member according to different embodiments of the invention.
Figure 9:
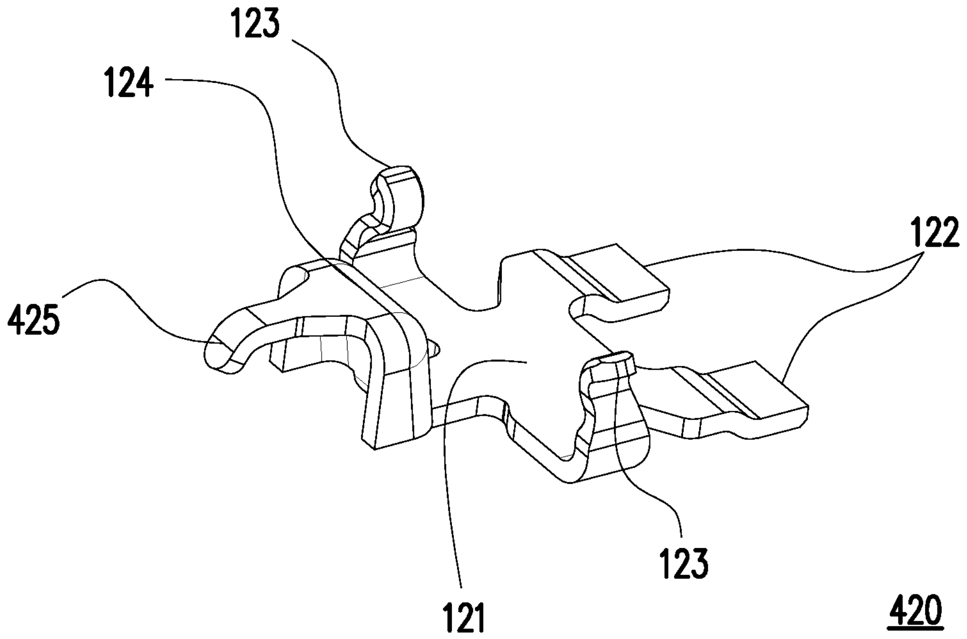

FIGS. 8 and 9 are schematic views of a first metal member according to different embodiments of the invention. Referring to FIG. 8 as well as FIG. 2, a first metal member 320 shown in FIG. 8 mainly differs from the first metal member 120 in that a head part 234 of the embodiment is in a U shape and therefore only covers three outer wall surfaces 111*b* of the middle island 111. Referring to FIG. 9 as well as FIG. 2, a first metal member 420 mainly differs from the first metal member 120 in that the bent degree and length of a bent part 425 extending from the head part 124 are smaller, but the bent part 425 is still smoothly embedded in the middle island 111 of the first body 110 to reinforce the integration strength of the components. In other words, the designer may appropriately adjust the sizes and the bending degrees of the bent parts 125 and 425 based on structural and material features.

In view of the foregoing, according to the embodiments of the invention, the socket connector of the board-to-board connector assembly is provided with the pair of first metal members and the pair of second metal members provided in the first body to separately provide the functions of the socket connector in the first metal members and the second metal members. The first metal member extends from the bottom of the first sidewall to the middle island by passing through the first accommodating slot, and the second metal member straddles the first sidewall. Therefore, when the connectors are mated, the first metal member and the second metal member are respectively pressed against the third metal member of the plug connector. As a consequence, the force taken by these metal members can be effectively spread when the connectors are mated.

Furthermore, with the drawn parts or the drawn subportions respectively formed by a drawing process, the respective coverage areas of the first metal member, the second metal member, and the third metal member with respect to the first body and the second body are increased, which brings a structural effect of comprehensive enclosure and facilitates the protection effect to the bodies. Thus, when the connectors are mated/released (or plugged/unplugged), the metal members can be prevented from being detached from the bodies or even damaging the bodies.

Besides, the first metal member and the second metal member respectively and separately provided in the first body also create a check and balance effect with each other. That is, the notch of the second metal member corresponds to the elastic body of the first metal member. Therefore, after the connectors are mated, the second metal member can stop the elastic body by using the local structure of the second metal member at the notch, thereby preventing the first metal member from being driven by the plug connector to be detached from the first body at the time of releasing (unplugging) the connector.

According to the above, compared with the conventional connectors in which the metal members are mated in a one-to-one relationship (i.e., one for each of the plug connector and the socket connector), the first metal member and the second metal member are adopted in the embodiments of the invention to share the force taken when the connectors are mated/released (or plugged/unplugged), making the structural strength between the metal members and the bodies sufficient for the plugging/unplugging process and avoiding damages during such process.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A board-to-board connector assembly, comprising:

a socket connector, comprising:

a first body, having a middle island, a first accommodating slot surrounding the middle island, and a first sidewall surrounding the first accommodating slot;

a pair of first metal members, respectively provided on opposite ends of the first body, wherein each of the first metal members extends from a bottom of the first sidewall to the middle island by passing through the first accommodating slot; and a pair of second metal members, respectively provided on opposite ends of the first body, wherein each of the second metal members straddles and covers a portion of the first sidewall;

a plug connector, mated with the socket connector and comprising:

a second body, having a second accommodating slot and a second sidewall surrounding the second accommodating slot; and a pair of third metal members, respectively provided on opposite ends of the second body, wherein each of the third metal members straddles and covers a portion of the second sidewall, wherein when the plug connector is mated with the socket connector, the second sidewall is inserted into the first accommodating slot, the middle island is inserted into the second accommodating slot, and the third metal members are pressed against the first metal members and the second metal members.

2. The board-to-board connector assembly as claimed in claim 1, wherein the first metal member comprises: a body plate located at a bottom of the first accommodating slot; two feet extending from the body plate to the bottom of the first sidewall; a pair of elastic bodies respectively extending from opposite parts of the body plate toward a top of the first sidewall and bent; and a head part extending from the body part and covering a portion of the middle island, wherein the head part and the feet are located on opposite sides of the body plate.

3. The board-to-board connector assembly as claimed in claim 2, wherein the head part covers at least an outer wall surface of the middle island.

4. The board-to-board connector assembly as claimed in claim 2, wherein the head part covers at least an outer wall surface of the middle island and a top of the middle island.

5. The board-to-board connector assembly as claimed in claim 4, wherein the head part is further provided with a bent part, and the bent part extends from the top of the middle island and is embedded into the middle island.

6. The board-to-board connector assembly as claimed in claim 4, wherein the head part comprises at least three sub-portions and a drawn sub-portion, the sub-portions respectively cover two outer wall surfaces and the top of the middle island, and the drawn portion is adjoined among the respective sub-portions.

7. The board-to-board connector assembly as claimed in claim 2, wherein the second metal member comprises three first cover parts and two first drawn parts, the first cover parts are each in an inverted U shape and respectively straddle three adjacent first wall bodies of the first sidewall, and each of the first drawn parts is adjoined, at an inner bent part, between two adjacent first cover parts of the first cover parts.

8. The board-to-board connector assembly as claimed in claim 7, wherein the middle one of the first cover parts has a bump facing toward the middle island, and when the plug connector is mated with the socket connector, the second metal member is pressed against and electrically conductive to the third metal member through the bump.

9. The board-to-board connector assembly as claimed in claim 8, wherein the third metal member comprises three second cover parts, the second cover parts each have an inverted U-shaped profile and straddle three adjacent second wall bodies of the second sidewall, a middle one of the second cover parts is pressed against the bump to be electrically conductive to the second metal member.

10. The board-to-board connector assembly as claimed in claim 7, wherein each of first cover parts located on opposite sides among the first cover parts is provided with a notch in correspondence with the elastic body of the first metal member, and in a removing direction of the plug connector and the socket connector, local structures of the respective first cover parts at the notches are located on movement paths of the pair of elastic bodies.

11. The board-to-board connector assembly as claimed in claim 10, wherein when the plug connector is mated with the socket connector, the pair of elastic bodies are pressed by the third metal member to expand, so as to correspond to the local structures of the respective first cover parts located at the notches.

12. The board-to-board connector assembly as claimed in claim 10, wherein the third metal member comprises three second cover parts, the second cover parts each have an inverted U-shaped profile and straddle three adjacent second wall bodies of the second sidewall, respective second cover parts located on opposite sides among the second cover parts are pressed against and electrically conductive to the pair of elastic bodies.

13. The board-to-board connector assembly as claimed in claim 7, wherein the third metal member comprises three second cover parts and two second drawn parts, the second cover parts are each in an inverted U shape and straddle three adjacent second wall bodies of the second sidewall, and each of the second drawn parts is adjoined, at an outer bent part, between two adjacent second cover parts of the second cover parts.

14. The board-to-board connector assembly as claimed in claim 13, wherein a middle one of the second cover parts at least has at least one recess to be correspondingly integrated with at least one protrusion of the second body.

15. The board-to-board connector assembly as claimed in claim 13, second cover parts located on opposite two sides among the second cover parts are each provided with a reversed hook to be hooked to the second body.

16. The board-to-board connector assembly as claimed in claim 1, wherein the socket connector further comprises a plurality of first terminals respectively provided in the first body, the plug connector further comprises a plurality of second terminals respectively provided in the second body, each of the first terminals and each of the second terminals are correspondingly pressed against each other, each of the first terminals extends from the first sidewall to the middle island by passing through the first accommodating slot, each of the first terminals has a necking structure at the first sidewall, each of the second terminals surrounds a local surface of the second body, each of the second terminals has a bent structure at the second sidewall facing away from the second accommodating slot, and the first terminal and the second terminal corresponding to each other are locked to each other through the necking structure and the bent structure.

17. The board-to-board connector assembly as claimed in claim 16, wherein a thickness of the second terminal remains the same through the bent structure.

18. The board-to-board connector assembly as claimed in claim 16, wherein a thickness of the second terminal is reduced through the bent structure.

19. A socket connector of a board-to-board connector assembly for mating with a plug connector, the socket connector comprising:

a first body, having a middle island, a first accommodating slot surrounding the middle island, and a first sidewall surrounding the first accommodating slot;

a pair of first metal members, respectively provided on opposite ends of the first body, wherein each of the first metal members extends from a bottom of the first sidewall to the middle island by passing through the first accommodating slot; and a pair of second metal members, respectively provided on opposite ends of the first body, wherein each of the second metal members straddles and covers a portion of the first sidewall.

20. The socket connector of the board-to-board connector assembly as claimed in claim 19, wherein the plug connector comprises:

a second body, having a second accommodating slot and a second sidewall surrounding the second accommodating slot; and a pair of third metal members, respectively provided on opposite ends of the second body, wherein each of the third metal members straddles and covers a portion of the second sidewall, wherein when the plug connector is mated with the socket connector, the second sidewall is inserted into the first accommodating slot, the middle island is inserted into the second accommodating slot, and the third metal members are pressed against the first metal members and the second metal members.

* * * * *